US006253196B1

(12) United States Patent
Fuh et al.

(10) Patent No.: US 6,253,196 B1
(45) Date of Patent: Jun. 26, 2001

(54) GENERALIZED MODEL FOR THE EXPLOITATION OF DATABASE INDEXES

(75) Inventors: Gene Y. C. Fuh; Michelle Mei-Chiou Jou, both of San Jose, CA (US); Kamilla Kazimierowicz, Kaiserslautern (DE); Brian Thinh-Vinh Tran, San Jose; Yun Wang, Saratoga, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/112,307

(22) Filed: Jul. 9, 1998

Related U.S. Application Data

(60) Provisional application No. 60/052,180, filed on Jul. 10, 1997.

(51) Int. Cl.[7] ........................................................ G06F 17/30
(52) U.S. Cl. ........................ 707/3; 707/2; 707/1; 707/4; 707/5; 707/6; 707/102; 707/204
(58) Field of Search ............................... 707/1, 3, 2, 5, 707/6, 204, 102, 4; 717/5; 706/46

(56) References Cited

U.S. PATENT DOCUMENTS

| 4,531,186 | 7/1985 | Knapman ..................... 707/5 |
| 4,841,433 | 6/1989 | Hakim et al. ................. 707/3 |
| 5,043,872 | 8/1991 | Cheng et al. ................. 707/2 |

(List continued on next page.)

FOREIGN PATENT DOCUMENTS 0 650 131 A1  4/1995  (DE) .

OTHER PUBLICATIONS

"Heirarchical Data Model for a Relational Database based Geographic Information System", *IBM® Technical Disclosure Bulletin*, 40(03):107–116 (Mar. 1997).

Lynch, C. et al., "Extended User—Defined Indexing with Application to Textual Databases", *Proceedings of the 14th VLDB Conference*, pp. 306–317 (1988).

Rudolf Bayer, "The Universal B—Tree for Multidimensional Indexing: General Concepts", Worldwide Computing and Its Applications, International Conference, WWCA '97, Tsukuba, Japan, (Mar. 1997), pp. 198–209.

Faloutsos, C. et al., "Fast Map: A Fast Algorithm for Indexing, Data—Mining and Visualization of Traditional and Multimedia Datasets", Proc. of ACM SIGMOD, pp. 163–174 (May 1995).

Ouksel, M. et al., "Multidimensional B—trees: Analysis of Dynamic Behavior", Dept. of Elec. Eng. and Computer Science, Northwestern Univ., Evanston, Ill., BIT 21, pp. 401–418 (1981).

Klaus, F. et al., "Flexible, Runtime Efficient Fector—Radix Algorithms For Multidimensional Fast Fourier Transform", SPIE, vol. 2247, Sensors and Control for Automation, pp. 216–226 (1994).

(List continued on next page.)

*Primary Examiner*—Thomas Black
*Assistant Examiner*—Diane Mizrahi
(74) *Attorney, Agent, or Firm*—Ingrid M. Foerster

(57) ABSTRACT

A method, apparatus, and article of manufacture for computer-implemented exploitation of database indexes. A statement is executed in a database stored on a data storage device connected to a computer. The database contains data. A model based on pattern matching for a user-defined predicate and selection of an index exploitation rule based on a matched user-defined predicate is provided to be used for exploiting an index to retrieve data from the database.

36 Claims, 9 Drawing Sheets

U.S. PATENT DOCUMENTS

| | | | |
|---|---|---|---|
| 5,299,123 | 3/1994 | Wang et al. | 707/2 |
| 5,327,543 | 7/1994 | Miura et al. | 712/224 |
| 5,404,510 | 4/1995 | Smith et al. | 707/2 |
| 5,454,039 | 9/1995 | Coppersmith et al. | 380/28 |
| 5,544,357 | 8/1996 | Huei | 707/2 |
| 5,546,576 | 8/1996 | Cochrane et al. | 707/104 |
| 5,553,281 | 9/1996 | Brown et al. | 707/104 |
| 5,590,325 | 12/1996 | Kolton et al. | 707/104 |
| 5,604,892 | 2/1997 | Nuttall et al. | 703/18 |
| 5,608,904 | 3/1997 | Chaudhuri et al. | 707/2 |
| 5,619,692 | 4/1997 | Malkemus et al. | 707/2 |
| 5,630,125 | 5/1997 | Zellweger | 707/103 |
| 5,630,127 | 5/1997 | Moore et al. | 707/104 |
| 5,765,147 * | 6/1998 | Mattos et al. | 707/4 |
| 5,799,310 * | 8/1998 | Anderson et al. | 707/102 |
| 5,822,750 * | 10/1998 | Jou et al. | 707/2 |
| 5,875,334 * | 2/1999 | Chow et al. | 717/5 |
| 5,893,104 * | 4/1999 | Srinivasan et al. | 707/102 |

OTHER PUBLICATIONS

Sang, K.S. et al., "Applicability of genetic algorithms to optimal evaluation of path predicates in object–oriented queries", Information Processing Letters, vol. 58, No. 3, pp. 123–128 (abstract), (May 1996).

Byungwook, K. et al., "A new indexing scheme supporting multi–attribute database applications: MAX", Journal of Systems Architecture, vol. 42, No. 2, pp. (abstract), (Sep. 1996). p. 1.

Silberschatz, A. et al., "Managing Class Types", SPI Database of Software Technologies, 6 pages, (May 1977).

Scheuermann, P. et al., "Multidimensional B—Trees For Associative Searching In Databases Systems", Inform. Systems, vol. 7, No. 2, pp. 123–137 (1982).

* cited by examiner

GENERALIZED MODEL FOR THE EXPLOITATION OF DATABASE INDEXES

PROVISIONAL APPLICATION

This application claims the benefit of U.S. Provisional Application No. 60/052,180, entitled "User Defined Search in Relational Database Management Systems," filed on Jul. 10, 1997, by Gene Y. C. Fuh et al., which is incorporated by reference herein.

CROSS-REFERENCE TO RELATED APPLICATIONS

This application is related to the following copending and commonly-assigned patent applications:

Application Ser. No. 09/113,976, entitled "User-Defined Search in Relational Database Management Systems," filed on same date herewith, by Gene Y. C. Fuh, et al.;

Application Ser. No. 09/112,723, entitled "Supporting Database Indexes Based on a Generalized B-Tree Index," filed on same date herewith, by Stefan Dessloch, et al.;

Application Ser. No. 09/112,301, entitled "Multiple-Stage Evaluation of UserDefined Predicates," filed on same date herewith, by Gene Y. C. Fuh, et al.;

Application Ser. No. 09/113,802, entitled "Run-time Support for User-Defined Index Ranges and Index Filters," filed on same date herewith, by Michelle Jou, et al.;

Application Ser. No. 09/112,302, entitled "A Fully Integrated Architecture For User-Defined Search," filed on same date herewith, by Gene Y. C. Fuh, et al.;

Application Ser. No. 08/786,605, entitled "A Database Management System, Method and Program for Supporting the Mutation of a Composite Object Without Read/Write and Write/Write Conflicts," filed on Jan. 21, 1997 now U.S. Pat. No. 5,857,182, by Linda G. DeMichiel, et al.; and Application Ser. No. 08/914,394, entitled "An Optimal Storage Mechanism for Persistent Objects in DBMS," filed on Aug. 19, 1997 now U.S. Pat. No. 6,065,013, by Gene Y. C. Fuh, et al.;

all of which are incorporated by reference herein.

BACKGROUND OF THE INVENTION

1. Field of the Invention

This invention relates in general to computer-implemented database systems, and, in particular, to a generalized model for the exploitation of database indexes.

2. Description of the Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

Many traditional business transaction processing is done using a RDBMS. Since the inclusion of RDBMSs in business, user-defined data types and user-defined functions have been brought into RDBMSs to enrich the data modeling and data processing power. User-defined data based on the user-defined data types may include audio, video, image, text, spatial data (e.g., shape, point, line, polygon, etc.), time series data, OLE documents, Java objects, C++ objects, etc.

Records of a table in a database can be accessed using an index when searching for a particular column value or range of values. An index is an ordered set of record identifiers (IDs) (e.g., pointers) to the records with one or more key column values from the records in the table. The index is used to access each record in the database with a key value. Without an index, finding a record would require a scan (e.g., linearly) of an entire table. Indexes provide an alternate technique to accessing data in a table. Users can create indexes on a table after the table is built. An index is based on one or more columns of the table that are used to compose a key. A B-tree is a binary tree that may be used to store the record identifiers and the key values to the records in a table.

When a table contains user-defined data, conventional systems typically do not provide exploitation of database indexes. Therefore, there is a need in the art for an improved technique for exploitation of database indexes.

SUMMARY OF THE INVENTION

To overcome the limitations in the prior art described above, and to overcome other limitations that will become apparent upon reading and understanding the present specification, the present invention discloses a method, apparatus, and article of manufacture for computer-implemented generalized model for the exploitation of database indexes.

In accordance with the present invention, a statement is executed in a database stored on a data storage device connected to a computer. The database contains data. A model based on pattern matching for a user-defined predicate and selection of an index exploitation rule based on a matched user-defined predicate is provided to be used for exploiting an index to retrieve data from the database.

An object of the invention is to exploit database indexes for databases containing structured data and non-structured data. Another object of the invention is to generate search ranges for user-defined predicates using built-in relations or user-defined relations. Yet another object of the invention is to recognize general patterns for index exploitation.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
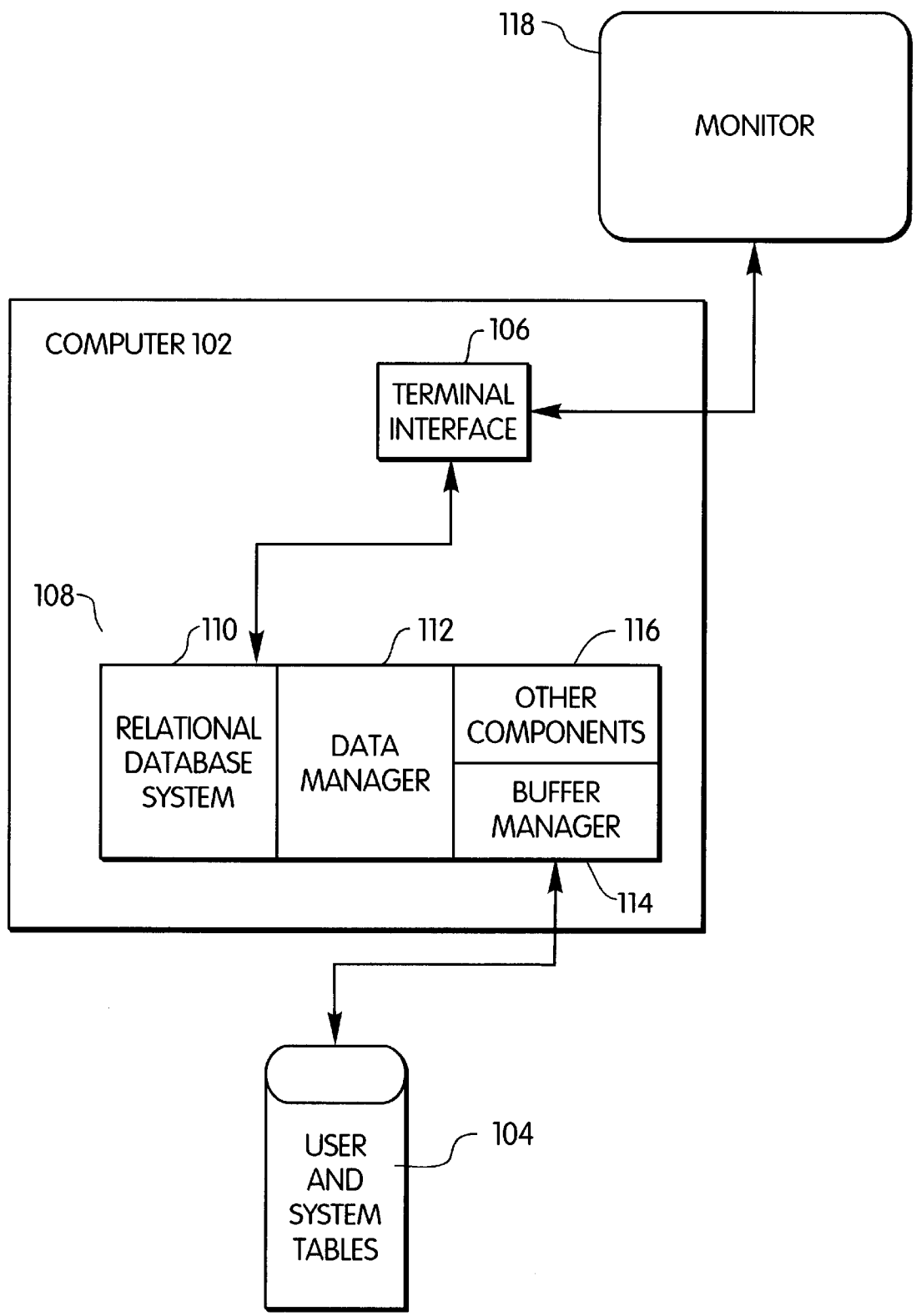
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104, such as a fixed or hard disk drive, a floppy disk drive, a CDROM drive, a tape drive, or other device, that store one or more relational databases.

Operators of the computer system 102 use a standard operator interface 106, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the AIX® operating system. Those skilled in the art will recognize, however, that the present invention has application to any DBMS software, whether or not the RDBMS software uses SQL.

At the center of the DB2® system is the Database Services module 108. The Database Services module 108 contains several submodules, including the Relational Database System (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
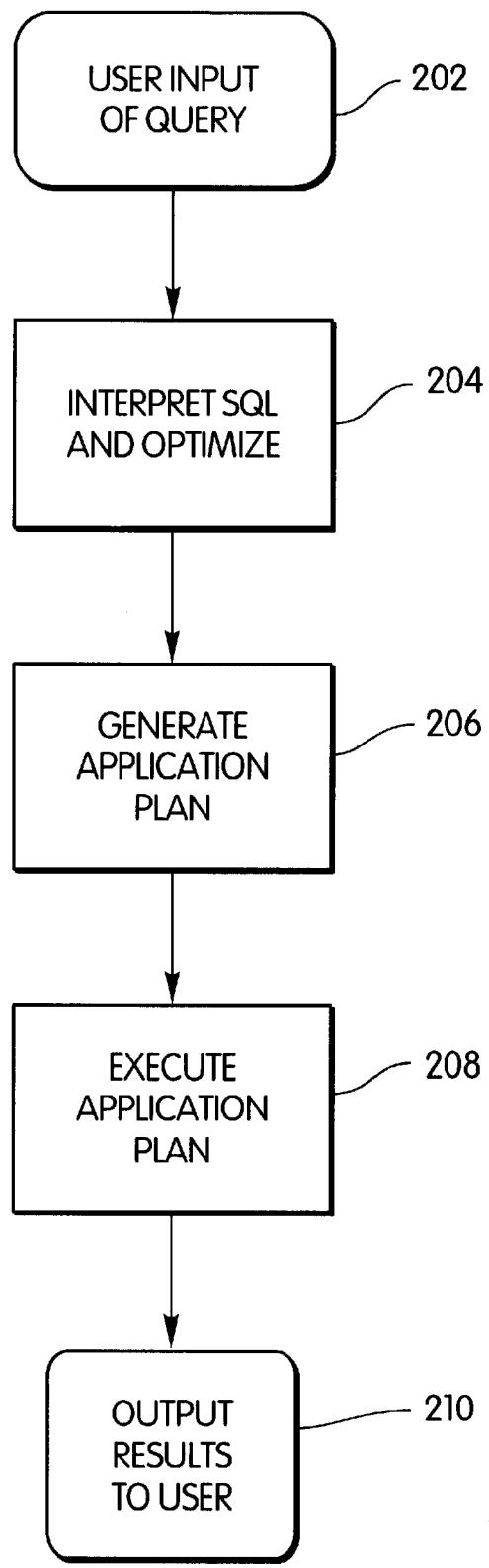
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may optimize the SQL. Block 206 represents the step of generating a compiled set of run-time structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
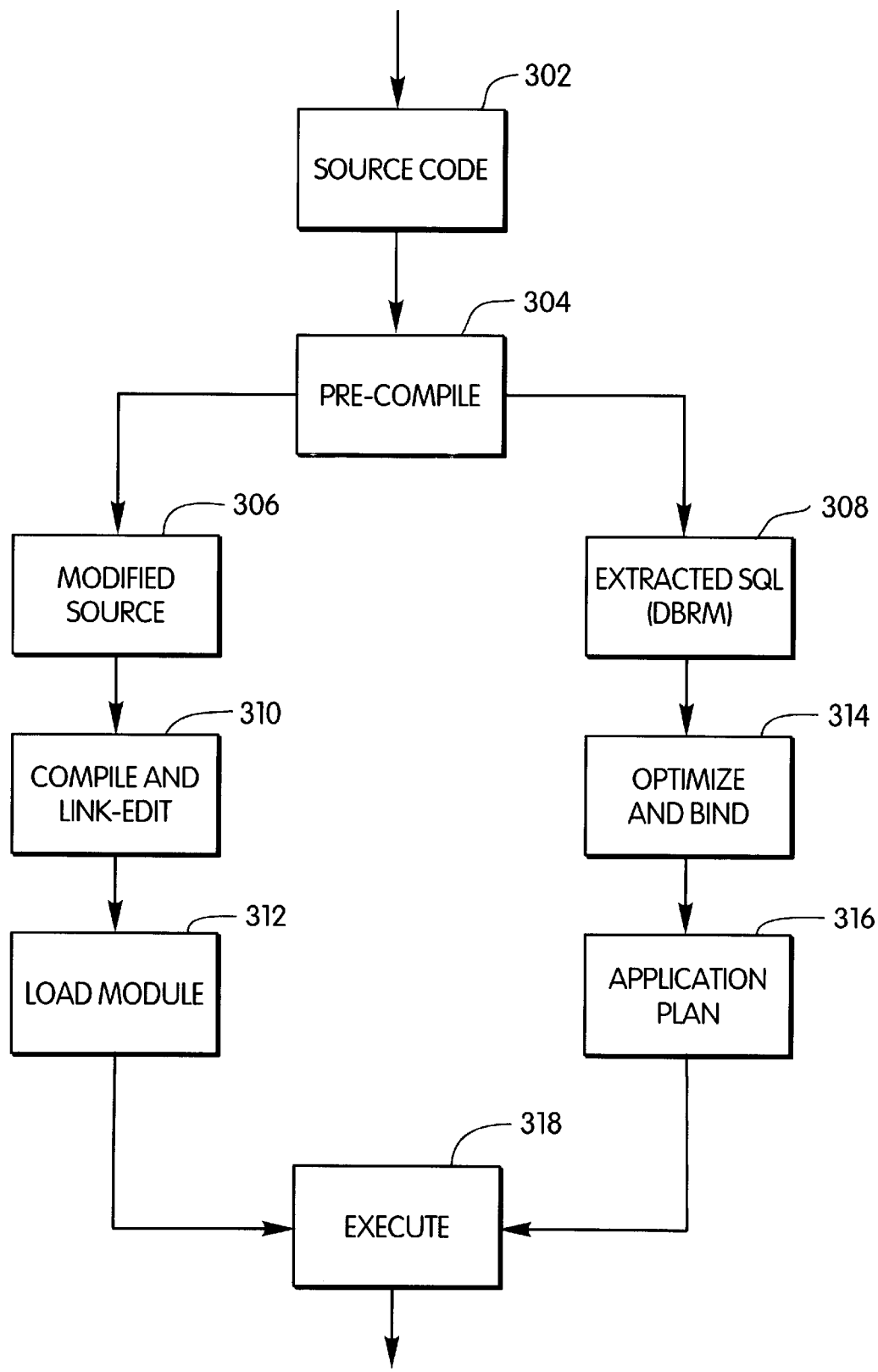
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 3008. The modified source module 306 contains host language calls to DB2®, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of run-time structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Figure 4:
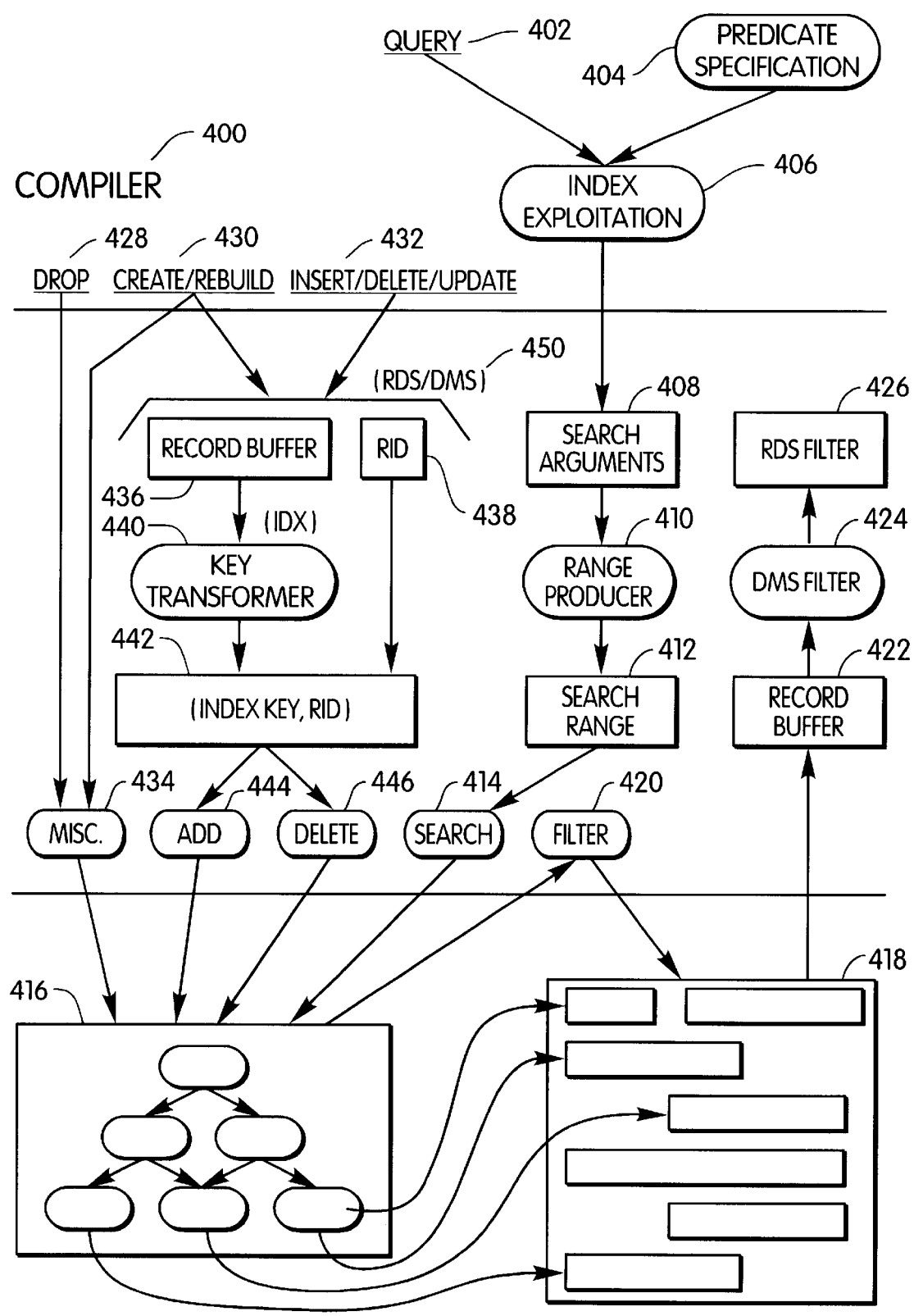
FIG. 4 illustrates a compiler of the present invention.

The Extended DBMS Architecture for User-Defined Search FIG. 4 illustrates a compiler 400 of the present invention, which performs steps 204 and 206, discussed above. The compiler 400 of the present invention contains the following "extended" modules: Predicate Specification 404 and Index Exploitation 406. The run-time 450 of the present invention contains the following "extended" modules: Range Producer 410, DMS Filter 424, RDS Filter 426, and Key Transformer 440. The "extended" modules have been modified to provide the capability for pushing user-defined types, index maintenance and index exploitation, and user-defined functions and predicates inside the database.

The Predicate Specification module 404 has been extended to handle user-defined predicates. The Index Exploitation module 406 has been modified to exploit user-defined indexes and provide more sophisticated pattern matching (e.g., recognizes "salary+bonus").

Additionally, the Predicate Specification module 404, the Index Exploitation module 406, and the DMS Filter module 424 work together to provide a technique to evaluate user-defined predicates using a three-stage technique. In the first stage, an index is applied to retrieve a subset of records using the following modules: Search Arguments 408, Range Producer 410, Search Range 412, Search 414, and Filter 420. For the records retrieved, in the second stage, an approximation of the original predicate is evaluated by applying a user-defined "approximation" function to obtain a smaller subset of records, which occurs in the DMS Filter module. In the third stage, the predicate itself is evaluated to determine whether the smaller subset of records satisfies the original predicate.

The Range Producer module 410 has been extended to handle user-defined ranges, and, in particular, to determine ranges for predicates with user-defined functions and user-defined types. The DMS Filter module 424 and the RDS Filter module 426 have been extended to handle user-defined functions for filtering data.

To process a query 402, the compiler 400 receives the query 402. The query 402 and the predicate specification from the Predicate Specification module 404 are submitted to the Index Exploitation module 406. The Index Exploitation module 406 performs some processing to exploit indexes. At run-time, the Search Arguments module 408 evaluates the search argument that will be used by the Range Producer module 410 to produce search ranges. The Range Producer module 410 will generate search ranges based on user-defined functions. The Search Range module 412 will generate final search ranges. The Search module 414 will perform a search using the B-Tree 416 to obtain the record identifier (ID) for data stored in the data storage device 418. The retrieved index key is submitted to the Filter module 420, which eliminates non-relevant records. Data is then fetched into the Record Buffer module 422 for storage. The DMS Filter module 424 and the RDS Filter module 426 perform final filtering.

The Key Transformer module 440 has been modified to enable users to provide user-defined functions for processing inputs to produce a set of index keys. The userdefined functions can be scalar functions or table functions. A scalar function generates multiple key parts to be concatenated into an index key. A table function generates multiple sets of key parts, each of which is to be concatenated into an index key. Additionally, the input to the Key Transformer module 440 can include multiple values (e.g., values from multiple columns or multiple attributes of a structured type), and the user-defined functions can produce one or more index keys.

The compiler 400 can process various statements, including a Drop 428, Create/Rebuild 430, or Insert/Delete/Update 432 statements. A Drop statement 428 may be handled by Miscellaneous modules 434 that work with the B-Tree 416 to drop data.

An Insert/Delete/Update statement produce record data in the Record Buffer module 436 and the RID module 438. The data in the Record Buffer module 436 is submitted to the Key Transformer module 440, which identifies key sources in the records it receives. Key targets from the Key Transformer module 440 and record identifiers from the RID module 438 are used by the Index Key/RID module 442 to generate an index entry for the underlying record. Then, the information is passed to the appropriate module for processing, for example, an Add module 444 or a Delete module 446.

The compiler 400 will process a Create/Rebuild statement 430 in the manner of the processing a Drop statement 428 when data is not in the table or an Insert/Delete/Update statement 432 when data is in the table.

Exploitation of Database Indexes Introduction

There are two major components involved in exploiting indexes: pattern matching and selection of exploitation rules. In the present invention, both pattern matching and selection of index exploitation rules can be user-defined. For pattern matching, a conventional system recognizes simple patterns (e.g., salary=50000 AND bonus<10000). On the other hand, the present invention recognizes complex patterns (e.g., recognizes "salary+ bonus" in a predicate "salary+bonus>5000"). Once the pattern has been identified, the next step is to determine how to generate search ranges based on the matched predicates. That is, the next step is selection of index exploitation rules.

The following are sample SQL statements used in a conventional system:

```
CREATE TABLE employee (eid int,
                       dept int,
                       name varchar(30),
                       salary float,
                       bonus float,
                       award float, . . . );
CREATE TABLE department (deptID int,
                         name varchar (30),
                         budget float,
                         mgr int, . . . );
CREATE INDEX comp ON employee (salary, bonus, award);
```

The first CREATE TABLE statement creates a table, named "employee", with several columns. The second CRE- ATE TABLE statement creates a table, named "department", with several columns. The CREATE INDEX statement creates an index, named "comp", for the "employee" table with the index keys "salary", "bonus", and "award". Each index key is called a "dimension" of the index.

Figure 5:
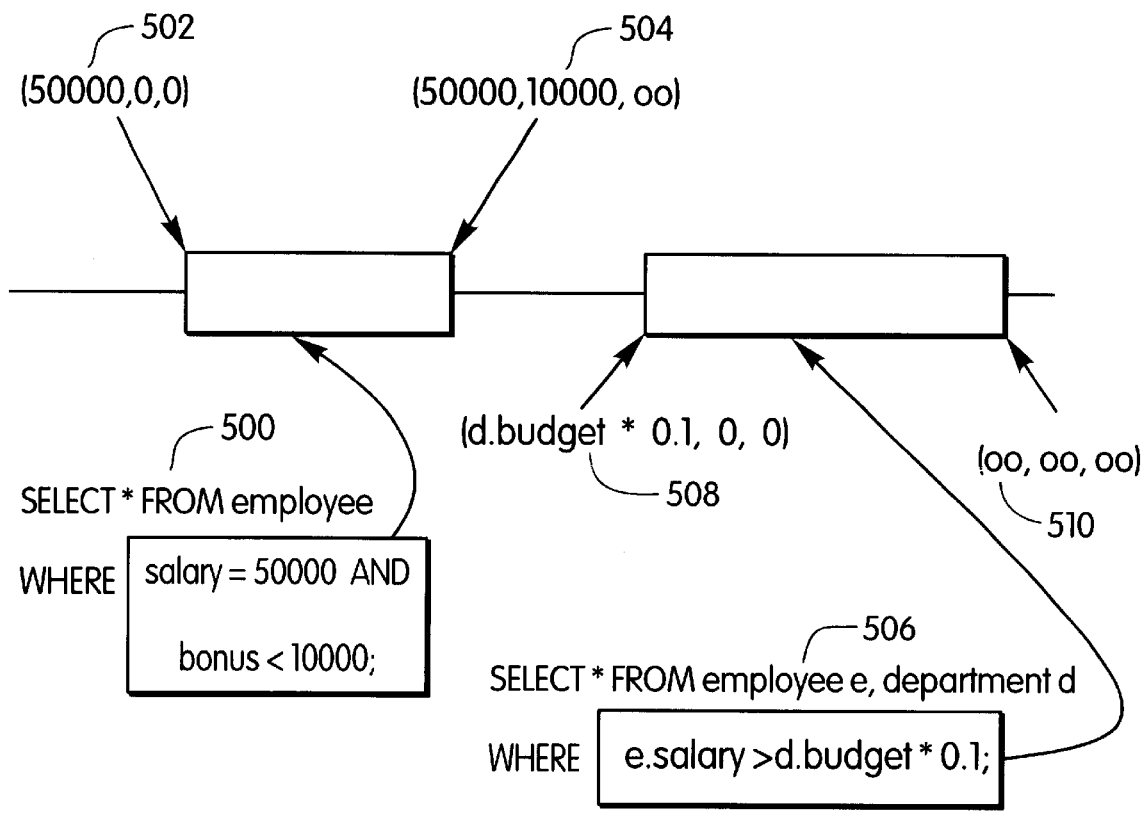
FIG. 5 is a diagram illustrating index exploitation in a conventional system.

FIG. 5 is a diagram illustrating index exploitation in a conventional system. The following statement 500 is illustrated in FIG. 5:

SELECT*FROM employee
WHERE salary=50000 AND bonus<10000;

Statement 500 selects records from the "employee" table, which has columns for salary, bonus, and award, which are used in the INDEX "comp". For statement 500, a conventional system is able to generate a range based on the limitations of the WHERE clause. In particular, for statement 500, for the INDEX "comp", the salary value is 50000, and the bonus value ranges from 0 to 10000. The award value ranges from 0 to infinity, as the value was not restricted by the WHERE clause. The range is represented as follows: (50000, 0, 0) 502 to (50000, 10000, ∞) 504.

The following statement 506 is also illustrated in FIG. 5:

SELECT*FROM employee e, department d
WHERE e.salary>d.budget*0.1;

Statement 506 selects records from the "employee" table and the "department" table based on the salary of an employee being greater than 10% of the budget for the employee's department. For statement 506, a range is represented as follows: (d.budget*0.1,0,0) 508 to (∞, ∞, ∞) 510.

The existing index exploitation technique, available in conventional systems, has several disadvantages. First, table records are sorted based on built-in relations, for example, the ordering may be based on mathematical relations on built-in data types, such as int, real, char, varchar, etc. Additionally, the built-in relations are based on "total ordering", which is a linear model. Conventional systems exploit indexes using only built-in predicates, such as <, >, <=, >=, =etc. Moreover, conventional systems find applicable -predicates for index exploitation based on very simple pattern matching mechanisms. Moreover, the usefulness of conventional indexes typically limited to one-dimensional searching.

The following pseudocode represents the steps of existing index exploitation in a conventional system:

```
For each index I:
    For each dimension D of index I;
        For each predicate P in the query:
            (1) Determine whether either side of predicate P is an
                index key.
            (2) If one side of predicate P is an index key, determine
                whether the other side of predicate P is a "bounded"
                expression.
            (3) If the other side of predicate P is a "bounded"
                expression, use predicate P as the key predicate for
                the dimension D of index I.
            (4) Next, determine the start/stop key for dimension D
                with the "bounded" expression in predicate P.
```

The above pseudocode for existing index exploitation selects each index "I" and each dimension "D" of the index. A dimension is a key part that was defined for the index with a CREATE INDEX statement. For each index and dimension, and each predicate "P" in a query, it is determined whether either side of the predicate "P" is a simple column that is part of an index (i.e., an index part). A predicate "P" is an expression that compares two values (e.g., A B). If neither side of the predicate "P" is a simple column that is part of an index, then index exploitation is not performed. If either side of the predicate "P" is a simple column that is part of an index, then it is determined whether the other side of the predicate "P" is a "bounded" expression. A "bounded" expression is an expression that does not use the value from the other side of the predicate to compute its result (e.g., d.budget*0.01). If the other side of the predicate "P" is not a "bounded" expression, index exploitation is not performed. If the other side of the predicate "P" is a "bounded" expression, the predicate "P" is used as the key predicate for the dimension "D" of index "I". That is, predicate "P" is used to exploit the index "I" for the identified key part. The start and stop keys that define the range for dimension "D" are determined by the "bounded" expression in predicate "P".

Weakness of the Existing System

Pattern matching and selection of index exploitation rules are the major components involved in exploiting indexes. In the present invention, both pattern matching and selection of index exploitation rules can be user-defined. A conventional system recognizes only simple patterns, while the present invention recognizes complex patterns. Once the complex pattern has been matched, the present invention determines how to generate search ranges based on the matched predicates. Because the conventional system cannot perform complex pattern matching, the conventional system is not able to determine how to generate search ranges based on the matched complex predicates.

The existing index exploitation has several disadvantages. For example, conventional index exploitation systems are not able to exploit indexes on expressions, such as "salary +bonus +award" or "location.area", referenced in the example CREATE INDEX statement below:

CREATE INDEX ON employee
(salary+bonus+award, location..area);

In particular, in conventional index exploitation systems, sorting is based on built-in relations. That is, the above statement indicates that records of the "employee" table are to be sorted based on a value coming from the first expression "salary+bonus+award" and the second expression "location..area". The index manager sorts records, for example, based on an integer value when "salary+bonus+ award" results in an integer value. However, the present invention no longer uses column values directly to sort. Instead, the present invention uses expressions over column values to sort records. Existing systems are not able to handle this because they only recognize simple columns and do not recognize expressions.

Another disadvantage of conventional index exploitation is that it can only index on built-in relations. Therefore, a conventional system could not exploit indexes based n user-defined relations, such as the example CREATE INDEX statement below that indexes using a user-defined index type, which is further explained in Application Ser. No. 09/112,723, entitled "Supporting Database Indexes Based on a Generalized B-Tree ndex," filed on same date herewith, by Stefan Dessloch, et al., which is incorporated by reference herein:

CREATE INDEX ON employee (location)
USING spatial_index(location);

In the above example, sorting is performed on a compound object, "location", using a user-defined function "spatial_index". On the other hand, conventional index exploitation systems are unable to sort on compound objects.

Exploitation of Database Indexes Overview

There are two major components involved in exploiting indexes: pattern matching and selection of index exploitation rules. In the present invention, both pattern matching and selection of index exploitation rules can be user-defined. The present invention recognizes complex patterns in predicates. Once the complex pattern has been matched, the present invention determines how to generate search ranges based on the matched predicates.

Figure 6:
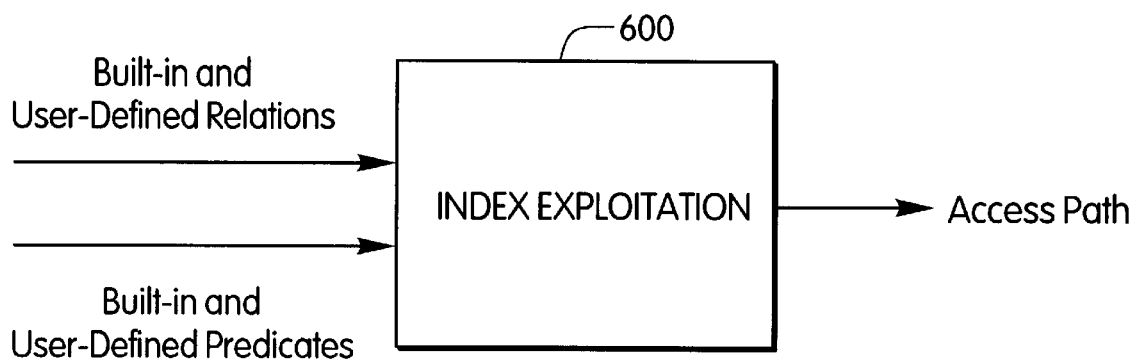
FIG. 6 is a block diagram illustrating the index exploitation system of the present invention.

FIG. 6 is a block diagram illustrating the index exploitation system 600 of the present invention. The index exploitation system 600 receives both built-in and user-defined relations along with both built-in and user-defined predicates. The index exploitation system 600 processes this input to identify an optimal access path for use in processing a query.

In particular, the index exploitation system 600 determines whether an index for the database is based on at least one user-defined relationship. Then, if it is determined that the index is based on at least one user-defined relationship, the index exploitation system determines whether an index pattern matches at least one predicate. If the index pattern matches at least one predicate, the index is exploited using that predicate to delimit the search ranges based on the user-defined relationship. The user-defined relationship is encapsulated within a user-defined index-type on which the index is based.

Unlike conventional systems, the index exploitation system 600 sorts table records based on user-defined relations as well as built-in relations. With the index exploitation system 600, the values for the index keys, by which table records are sorted, are generated with user-defined functions, such as "generated_grid_index" (i.e., the index entries are function (expression) result over index keys). The index exploitation system 600 is able to process user-defined relations on which an index is based, instead of using only the "total ordering" of conventional systems.

Generalized Pattern Matching

The index exploitation system 600 of the present invention performs generalized pattern matching . The following discussion focuses on pattern matching for two cases:

pattern matching for the exploitation of a user-defined index type and pattern matching for the exploitation of an index-on-expression.

The index exploitation system 600 uses user-defined predicates as well as built-in predicates (e.g., <, >, <=, >=, =) to exploit indexes. The index exploitation system 600 finds applicable predicates for index exploitation based on a generalized pattern matching mechanism. Additionally, the index exploitation system 600 uses indexes in a multi-dimensional search as well as in a one-dimensional search.

Pattern Matching for the Exploitation of a User-Defined Index Type

The following pseudocode represents the code used to create a user-defined function:

CREATE FUNCTION within (x shape, y shape)
RETURN INT
LANGUAGE C

. . .

EXTERNAL NAME 'spatialLib!within'
AS PREDICATE WHEN=1
SEARCH BY INDEX EXTENSION gridIndex
   WHEN KEY(X) USE search1By2(y)
   WHEN KEY(Y) USE search2By1(x);

The CREATE FUNCTION creates a function called "within" with arguments "x" and "y". The AS PREDICATE WHEN=1 statement identifies the matching pattern for index exploitation. The SEARCH BY INDEX EXTENSION statement identifies "gridIndex" as an index based on a user-defined relationship. The WHEN statements identify index exploitation rules to be used for each argument. In particular, if the argument represented by "x" is an index using the user-defined relationship in "gridIndex", the index exploitation rule used is "search1By2(y)". If the argument represented by "y" is an index using the user-defined relationship in "gridIndex", the index exploitation rule used is "search2By1(x)". The index exploitation rules would be further defined in the user-defined function "gridIndex".

Figure 7:
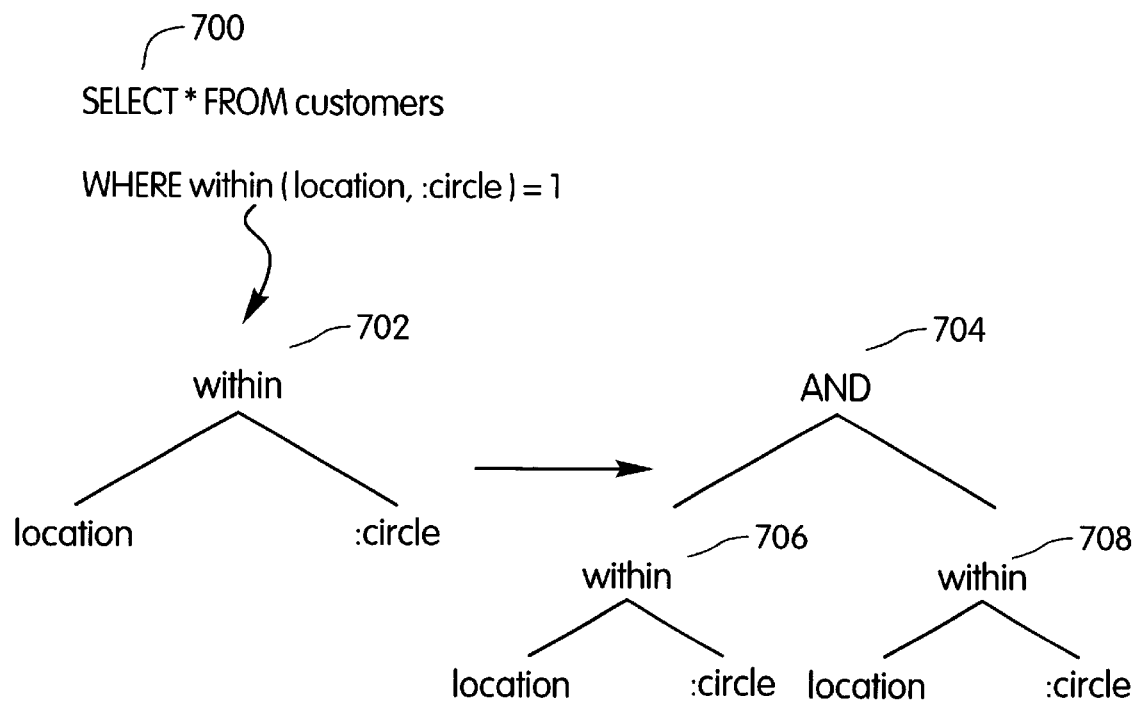
FIG. 7 is a diagram illustrating predicate cloning for a user-defined predicate by the index exploitation system.

FIG. 7 is a diagram illustrating predicate cloning for a user-defined predicate by the index exploitation system 600. Predicate cloning is used to enable generalized pattern matching. The following SQL statement 700 is illustrated in FIG. 7:

SELECT*FROM customers
WHERE within (location, :circle) 1;

SQL statement 700 would be represented in a conventional system as a binary tree 702. The index exploitation system 600 clones the "within (location, :circle)=1" user-defined predicate. In particular, the index exploitation system 600 generates a new binary tree 704 with binary sub-trees 706 and 708, which represent the two user-defined "within (location, :circle)=1" predicates of SQL statement 700 after the cloning. The two sub-trees 706 and 708 are ANDed together in the binary tree 704. When two predicates are ANDed together, if the evaluation of the original predicate would evaluate to a TRUE value, then ANDing the original predicate with itself would result in a TRUE value.

Pattern Matching for the Exploitation of an Index-on-Expression

The following is a sample SQL statement for creating a table used by the index exploitation system 600:

---

CREATE TABLE employee (eid int,
                  dept int,
                  name varchar (30),
                  salary float,
                  bonus float,
                  . . . )

---

The CREATE TABLE statement creates a table named "employee" with at least five columns, including columns for salary and bonus. The ellipses indicate that other columns may be included in the table.

Figure 8:
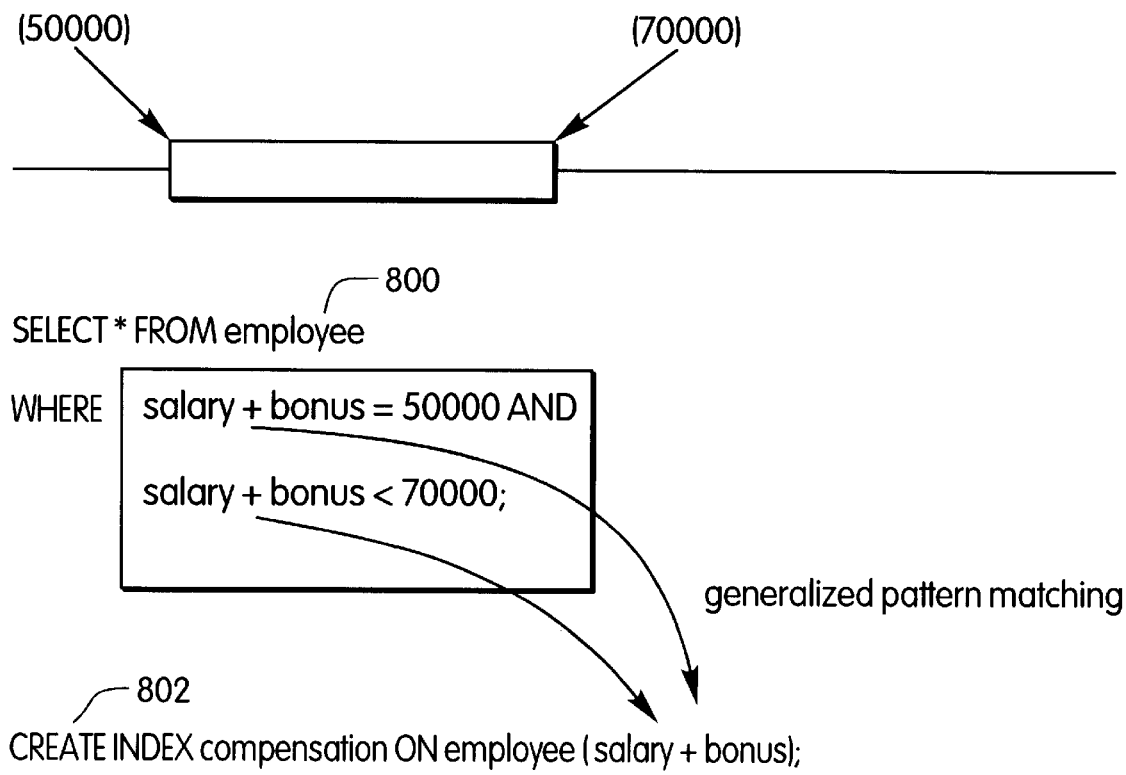
FIG. 8 is a diagram illustrating generalized pattern matching for key expressions with the index exploitation system.

FIG. 8 is a diagram illustrating generalized pattern matching for key expressions with the index exploitation system 600. The following SQL statement 800 is illustrated in FIG. 8:

SELECT*FROM employee
WHERE salary+bonus=50000 AND
   salary+bonus<70000;

The index exploitation system 600 is able to understand that the values in the salary and bonus columns of the "employee" table are to be added together to process the "salary +bonus" expression. Additionally, the index exploitation system 600 understands that the range of values will be from 50000 to under 70000.

Moreover, the index exploitation system 600 is able to perform generalized pattern matching. For example, the following SQL statement 802 creates an index:

CREATE INDEX compensation ON employee (salary+
   bonus);

The CREATE INDEX statement 802 creates an index called "compensation" on the "employee" table using the expression "salary +bonus". The index exploitation system 600 recognizes the expression "salary +bonus" and is able to match this to the "salary+bonus" expression in the SELECT statement 800.

Selection of Index Exploitation Rules

The index exploitation system 600 of the present invention exploits index using index exploitation rules. The following discussion focuses on two cases of index exploitation: a case in which an index is based on built-in relations and a case in which an index is based on a user-defined relation.

The following pseudocode represents the steps of the index exploitation system 600 to perform index exploitation:

```
For each index I:
    IF the index is based on built-in relations
    THEN call exploitBtreeIndex,
    ELSE call exploitNonBtreeIndex;
```

Initially, the index exploitation system 600 determines whether the index is based on built-in relations. If the index is based on built-in relations, the index exploitation system 600 will invoke the exploitBtreeIndex function described below. If the index is based on user-defined relations, the index exploitation system 600 will invoke the exploitNonBtreeIndex function described below.

Index Exploitation Rule Selection for Indexes Based on Built-in Relationships

The following is pseudocode for the exploitBtreeIndex function:

---

For each index I:
    For each dimension D of index I:
        For each predicate P in the query:
            (1) Determine whether either side of predicate P is an index key part, which, in this case, can be either a simple column or a scalar expression.
            (2) If one side of predicate P is an index key part, determine whether the other side of predicate P is a "bounded" expression.
            (3) If the other side of predicate P is a "bounded" expression, use predicate P as the key predicate for the dimension D of index I.
            (4) Next, determine the start/stop key for dimension D with the "bounded" expression in predicate P.

---

In the above pseudocode for index exploitation, the index exploitation system 600 selects each index "I" and each dimension "D" of the index. For each index and dimension, and each predicate "P" in a query, the index exploitation system 600 determines whether either side of the predicate "P" is an index key part. If neither side of the predicate "P" is an index key part, then the index exploitation system 600 does not perform index exploitation. If either side of the predicate "P" is an index key part, then the index exploitation system 600 determines whether the other side of the predicate "P" is a "bounded" expression. If the other side of the predicate "P" is not a "bounded" expression, the index exploitation system 600 does not perform index exploitation. If the other side of the predicate "P" is a "bounded" expression, the index exploitation system 600 uses the predicate "P" as the key predicate for the dimension "D" of index "I". That is, the predicate "P" is used to exploit the index "I" for the identified key part. The index exploitation system 600 sets the start and stop keys that define the range for dimension "D" are by the "bounded" expression in predicate "P".

Selection of Index Exploitation Rules for User-Defined Index Types

The following is pseudocode for the exploitNonBtreeIndex function:

---

For each predicate P in the query:
    For each combination of arguments A of predicate P:
        (1) Determine whether each combination of arguments A is an index key part, which, in this case, is a set of columns specified in the index exploitation rules of the corresponding CREATE FUNCTION statement.
        (2) If the combination of arguments A is an index key part, find the index exploitation rule E for the combination of arguments A.
        (3) Determine whether the remaining arguments used by E are "bounded".
        (4) If the remaining arguments are "bounded", record the user-defined range function in the access plan.
        (5) Next, generate the start/stop keys using the user-defined range function at run-time.

---

The above pseudocode for index exploitation selects each predicate "P" in the query, and then processes each combination of arguments "A" in the predicate "P". The index exploitation system 600 determine whether each combination of arguments "A" is an index key part. If the combination of arguments "A" is not an index key part, the index exploitation system 600 does not perform index exploitation. If the combination of arguments "A" is an index key part, the index exploitation system 600 finds the index exploitation rule "E" for argument "A". The index exploitation rule refers to a search method in which the range-producing function is specified. The index exploitation system 600 then determines whether the remaining arguments used by the index exploitation rule "E" are "bounded". If they are not "bounded", the index exploitation system 600 does not perform index exploitation. If they are "bounded", the index exploitation system 600 records the user-defined range function in the access plan. The index exploitation system 600 generates the start and stop keys for the range by using the range function at run-time.

For example, if the predicate "P" is "within (location, :circle)=1", then the index exploitation system 600 would select each combination of arguments "A" of the predicate "P". Assuming that the "location" argument were selected, the index exploitation system 600 would then find the index exploitation rule for the argument. The user-defined function "within" is defined above and includes the following statement defining index exploitation rules:

SEARCH BY INDEX EXTENSION gridIndex
        WHEN KEY(X) USE search1By2(y)
        WHEN KEY(Y) USE search2By1(x);

Here, since the argument "location" is "x", the search1By2(y) index exploitation rule is used, with the argument ":circle" replacing "y". Then, the index exploitation system 600 determines whether the remaining argument ":circle" is "bounded". Since the argument ":circle" is bounded, the index exploitation system 600 would record the user-defined range function in the access plan and generated the range using the user-defined range function at run-time.

Advantages of Exploitation of Database Indexes

The index exploitation system 600 has several advantages. The index exploitation system 600 provides a uniform model for exploiting database indexes. Additionally, the index exploitation system 600 provides a generalized technique for exploiting indexes derived from the existing technique. Moreover, the index exploitation system 600 is easy to implement and has a minimum impact on the existing system. Nonetheless, the index exploitation system 600 is very powerful and can handle indexing on expressions, user-defined index types, etc.

Flow Diagrams

Figure 9:
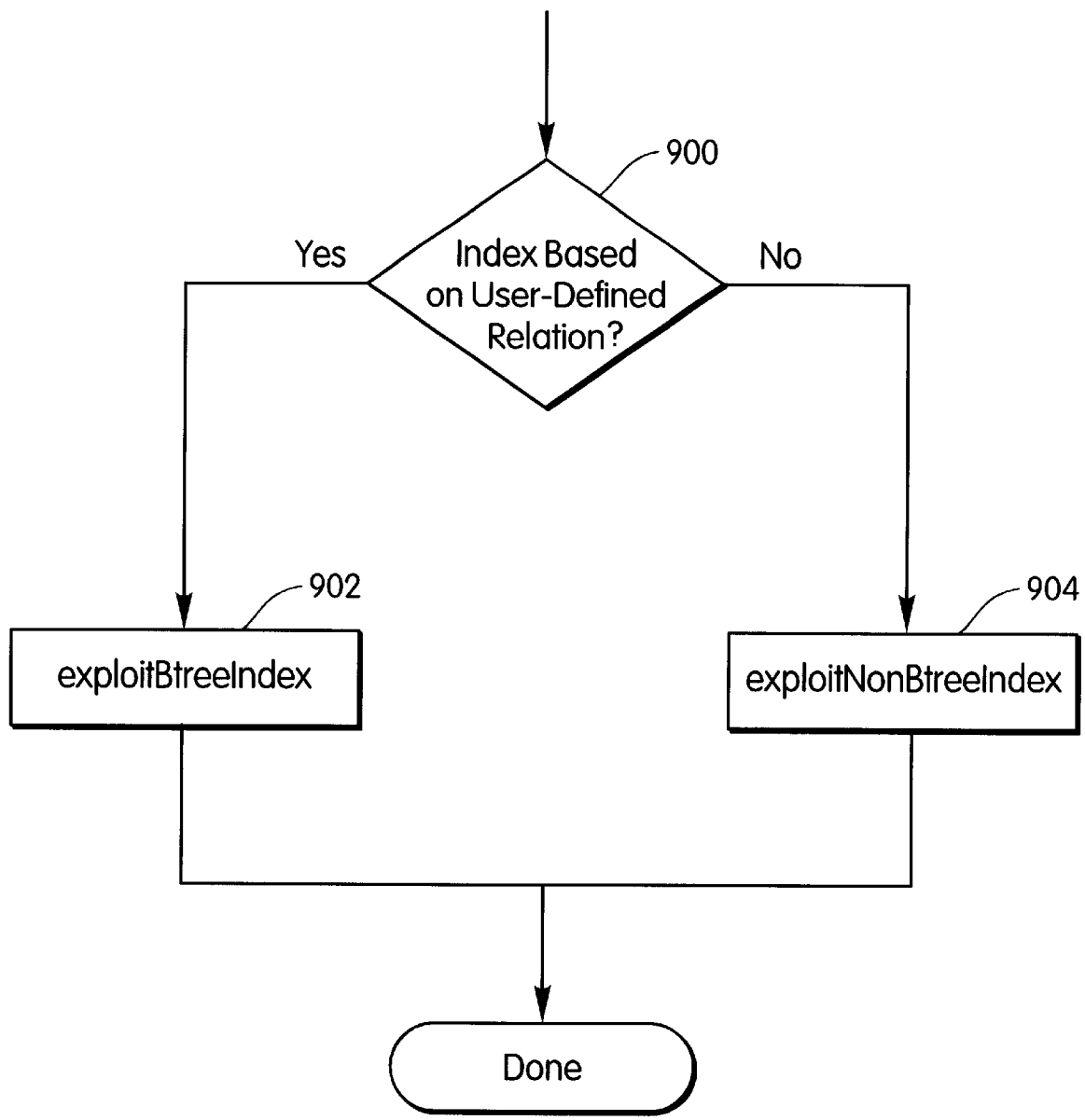
FIG. 9 is a flow diagram illustrating the steps performed by the index exploitation system to perform index exploitation.

FIG. 9 is a flow diagram illustrating the steps performed by the index exploitation system 600 to perform index exploitation. In Block 900, the index exploitation system 600 determines whether the index is based on a user-defined relation. If the index is based on a user-defined relation, the index exploitation system 600 continues to Block 902, otherwise, the index exploitation system 600 continues to Block 904. In Block 902, the index exploitation system 600 invokes the exploitNonBtreeIndex function. In Block 904, the index exploitation system 600 invokes the exploitBtreeIndex function.

Figure 10:
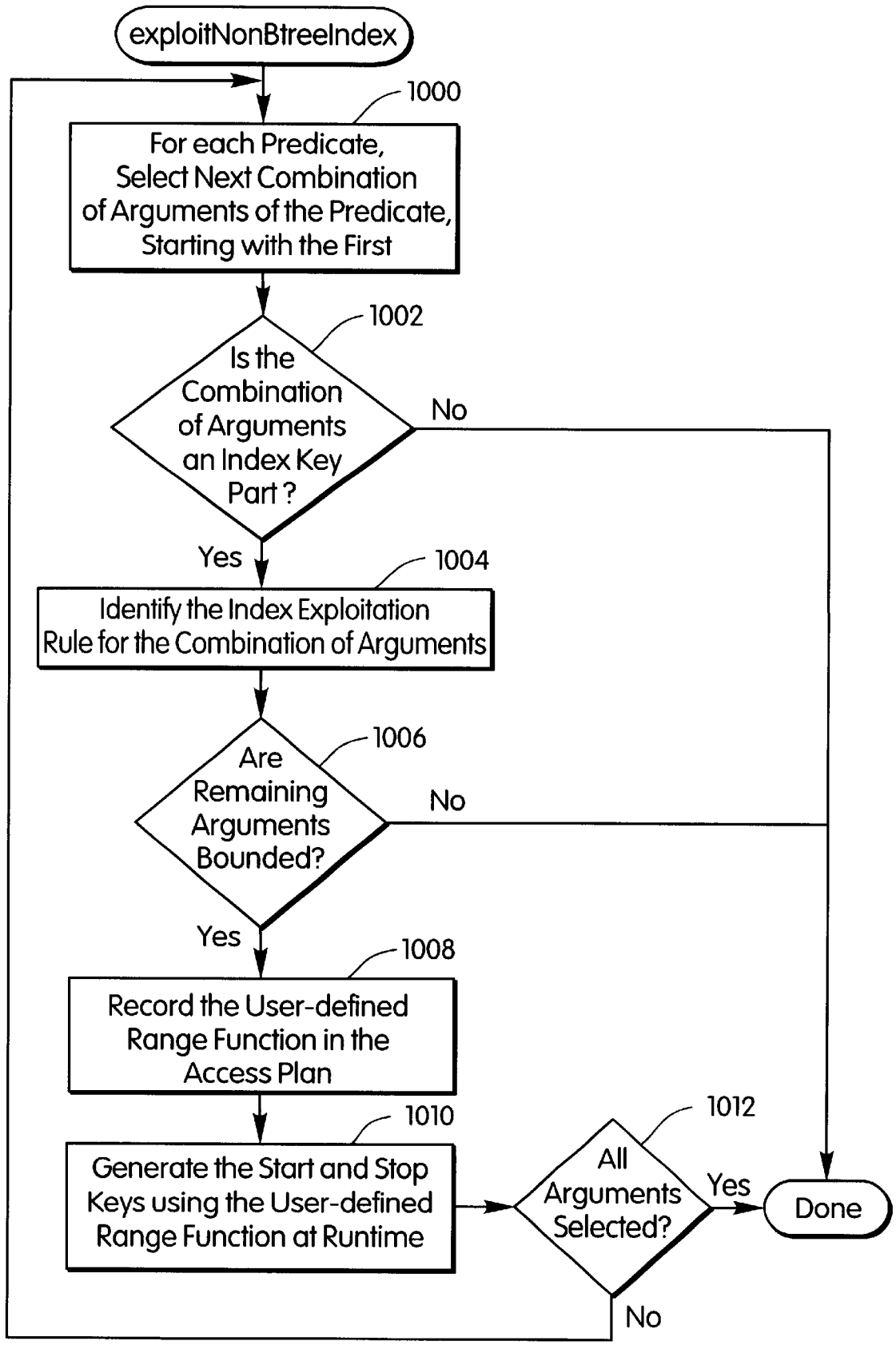
FIG. 10 is a flow diagram illustrating the steps performed by the index exploitation system to execute the exploitNonBtreeIndex function.

FIG. 10 is a flow diagram illustrating the steps performed by the index exploitation system 600 to execute the exploitNonBtreeIndex function. The index exploitation system 600 performs steps 1000–1012 for each predicate in the query. In Block 1000, for each predicate, the index exploitation system 600 selects the next combination of arguments of the predicate, starting with the first. In Block 1002, the index exploitation system 600 determines whether the combination of arguments is an index key part. If the combination of arguments is an index key part, the index exploitation system 600 continues to Block 1004, otherwise, the index exploitation system 600 does not perform index exploitation and is done. In Block 1004, the index exploitation system 600 identifies the index exploitation rule for the combination of arguments. In Block 1006, the index exploitation system 600 determines whether the remaining arguments are "bounded". If the remaining arguments are "bounded", the index exploitation system 600 continues to Block 1008, otherwise the index exploitation system 600 does not perform index exploitation and is done. In Block 1008, the index exploitation system 600 records the user-defined range function in the access plan. In Block 1010, the index exploitation system 600 generates the start and stop keys using the user-defined range function at run-time. In Block 1012, the index exploitation system 600 determines whether all arguments have been selected. If all arguments have been selected, the index exploitation system 600 is done, otherwise, the index exploitation system 600 loops back to Block 1000 to select the next combination of arguments.

Figure 11:
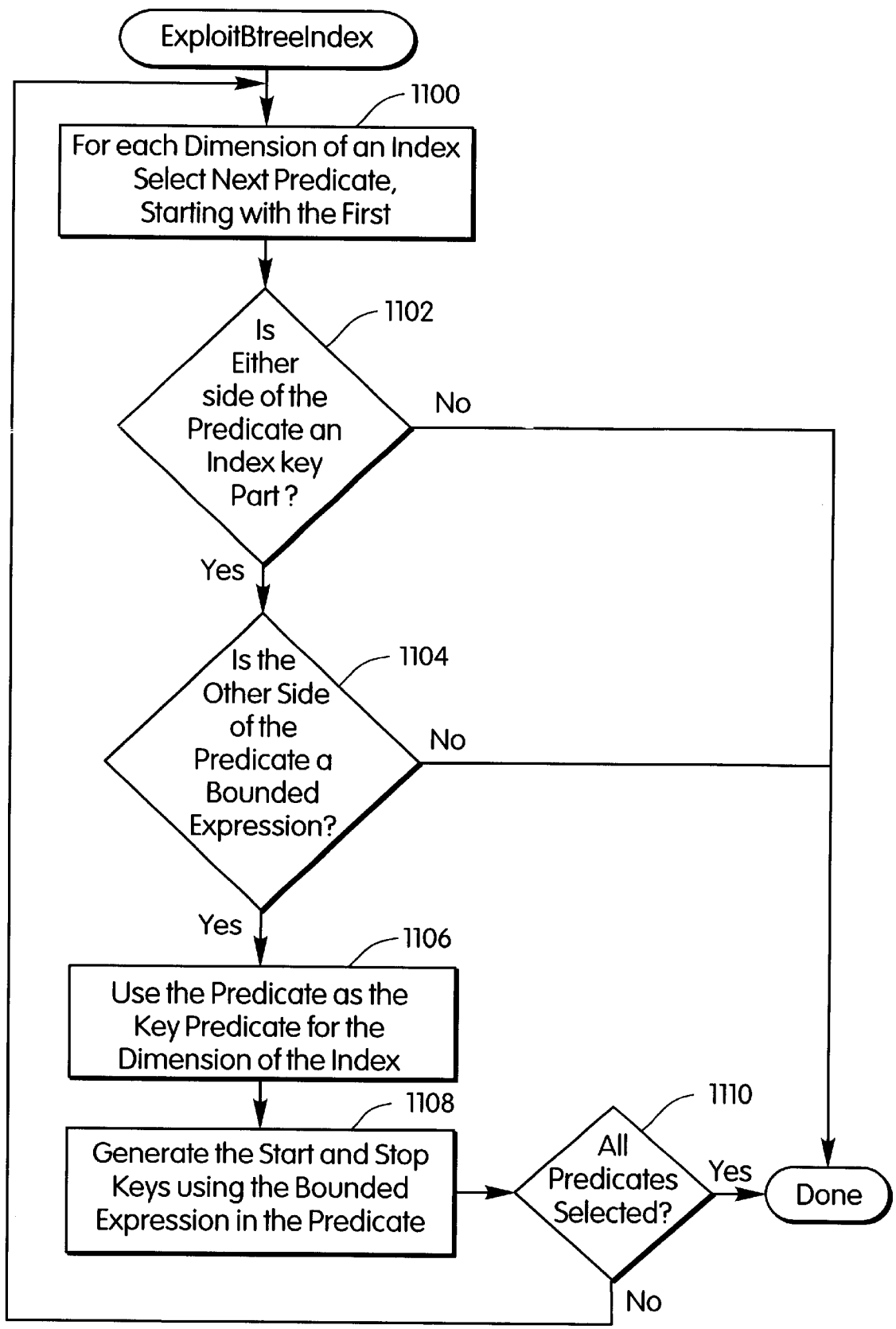
FIG. 11 is a flow diagram illustrating the steps performed by the index exploitation system to execute the exploitBtreeIndex function.

FIG. 11 is a flow diagram illustrating the steps performed by the index exploitation system 600 to execute the exploitBtreeIndex function. The index exploitation system 600 performs steps 1100–1110 for each dimension of each index. In Block 1100, for each dimension of an index, the index exploitation system 600 selects the next predicate, starting with the first. In Block 1102, the index exploitation system 600 determines whether either side of the predicate is an index key part. If either side is an index key part, the index exploitation system 600 continues to Block 1104, otherwise, the index exploitation system 600 does not perform index exploitation and is done. In Block 1104, the index exploitation system 600 determines whether the other side of the predicate is a "bounded" expression. If the other side of the predicate is a "bounded" expression, the index exploitation system 600 continues to Block 1106, otherwise, the index exploitation system 600 does not perform index exploitation and is done. In Block 1106, the index exploitation system 600 uses the predicate as the key predicate for the dimension of the index. In Block 1108, the index exploitation system 600 generates the start and stop keys using the "bounded" expression in the predicate. In Block 1110, the index exploitation system 600 determines whether all predicates have been selected. If all predicates have been selected, the index exploitation system 600 is done, otherwise, the index exploitation system 600 loops back to Block 1100 to select the next predicate.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented exploitation of database indexes. The present invention exploits database indexes for databases containing structured data and non-structured data. Additionally, the present invention generates search ranges for user-defined predicates using built-in relations or user-defined relations. Moreover, the present invention recognizes general patterns for index exploitation.

The foregoing description of the preferred embodiment of the invention has been resented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of enabling exploitation of an index in a database stored on a data storage device connected to a computer, wherein the database contains data, the method comprising the step of:

providing a model based on pattern matching for a user-defined predicate, which is used to select data from the database, and selection of an index exploitation rule, comprising a search method for exploiting an index, based on a matched user-defined predicate, wherein the model is to be used for exploiting an index to retrieve data from the database.

2. The method of claim 1, wherein the pattern matching is generalized pattern matching.

3. The method of claim 2, wherein the index is based on a user-defined index type, further comprising the step of predicate cloning.

4. The method of claim 2, wherein the generalized pattern matching is used for generalized key expressions for indexing on expressions.

5. The method of claim 1, wherein the selection of an index exploitation rule is based on a definition of an associated user-defined function.

6. The method of claim 1, wherein the index is a B-tree index.

7. The method of claim 1, wherein index is a user-defined index.

8. The method of claim 1, further comprising the step of indexing on expressions.

9. The method of claim 1, wherein the pattern matching further comprises the step of determining that the index is based on at least one user-defined relationship.

10. The method of claim 9, wherein the pattern matching further comprises the step of determining that an index pattern matches a combination of arguments of the predicate.

11. The method of claim 10, wherein the step of selecting an index exploitation rule further comprises the step of using the matched combination of arguments of the predicate to delimit a search range based on the user-defined relationship.

12. The method of claim 11, wherein the user-defined relationship is encapsulated within a user-defined index-type on which the index is based.

13. An apparatus for enabling exploitation of an index, comprising:
 a computer having a data storage device connected thereto, wherein the data storage device stores a database containing data;
 one or more computer programs, performed by the computer, for providing a model based on pattern matching for a user-defined predicate, which is used to select data from the database, and selection of an index exploitation rule, comprising a search method for exploiting an index, based on a matched user-defined predicate, wherein the model is to be used for exploiting an index to retrieve data from the database.

14. The apparatus of claim 13, wherein the pattern matching is generalized pattern matching.

15. The apparatus of claim 14, wherein the index is based on a user-defined index type, further comprising the means for predicate cloning.

16. The apparatus of claim 14, wherein the generalized pattern matching is used for generalized key expressions for indexing on expressions.

17. The apparatus of claim 13, wherein the selection of an index exploitation rule is based on a definition of an associated user-defined function.

18. The apparatus of claim 13, wherein the index is a B-tree index.

19. The apparatus of claim 13, wherein index is a user-defined index.

20. The apparatus of claim 13, further comprising the means for indexing on expressions.

21. The apparatus of claim 13, wherein the pattern matching further comprises the means for determining that the index is based on at least one user-defined relationship.

22. The apparatus of claim 21, wherein the pattern matching further comprises the means for determining that an index pattern matches a combination of arguments of the predicate.

23. The apparatus of claim 22, wherein the means for selecting an index exploitation rule further comprises the means for using the matched combination of arguments of the predicate to delimit a search range based on the user-defined relationship.

24. The apparatus of claim 23, wherein the user-defined relationship is encapsulated within a user-defined index-type on which the index is based.

25. An article of manufacture comprising a computer program carrier readable by a computer and embodying one or more instructions executable by the computer to perform method steps for enabling exploitation of an index in a database stored in a data storage device connected to the computer, wherein the database contains data, the method comprising:
 providing a model based on pattern matching for a user-defined predicate, which is used to select data from the database and selection of an index exploitation rule, comprising a search method for exploiting an index, based on a matched user-defined predicate, wherein the model is to be used for exploiting an index to retrieve data from the database.

26. The article of manufacture of claim 25, wherein the pattern matching is generalized pattern matching.

27. The article of manufacture of claim 26, wherein the index is based on a user-defined index type, further comprising the step of predicate cloning.

28. The article of manufacture of claim 26, wherein the generalized pattern matching is used for generalized key expressions for indexing on expressions.

29. The article of manufacture of claim 25, wherein the selection of an index exploitation rule is based on a definition of an associated user-defined function.

30. The article of manufacture of claim 25, wherein the index is a B-tree index.

31. The article of manufacture of claim 25, wherein index is a user-defined index.

32. The article of manufacture of claim 25, further comprising the step of indexing on expressions.

33. The article of manufacture of claim 25, wherein the pattern matching further comprises the step of determining that the index is based on at least one user-defined relationship.

34. The article of manufacture of claim 33, wherein the pattern matching further comprises the step of determining that an index pattern matches a combination of arguments of the predicate.

35. The article of manufacture of claim 34, wherein the step of selecting an index exploitation rule further comprises the step of using the matched combination of arguments of the predicate to delimit a search range based on the user-defined relationship.

36. The article of manufacture of claim 35, wherein the user-defined relationship is encapsulated within a user-defined index-type on which the index is based.

* * * * *